(12) United States Patent
Iizuka

(10) Patent No.: US 7,747,103 B2
(45) Date of Patent: Jun. 29, 2010

(54) IMAGE MATCHING SYSTEM, PROGRAM, AND IMAGE MATCHING METHOD

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1000 days.

(21) Appl. No.: 11/039,870

(22) Filed: Jan. 24, 2005

(65) Prior Publication Data

US 2005/0180636 A1 Aug. 18, 2005

(30) Foreign Application Priority Data

Jan. 28, 2004 (JP) ............................. 2004-020204

(51) Int. Cl.
*G06K 9/64* (2006.01)
(52) U.S. Cl. ................. 382/278; 382/281; 382/209; 382/115; 382/149; 600/410; 348/239
(58) Field of Classification Search ................. 382/278
See application file for complete search history.

(56) References Cited

U.S. PATENT DOCUMENTS

| | | | | | |
|---|---|---|---|---|---|
| 4,731,860 | A | * | 3/1988 | Wahl ........................... | 382/281 |
| 5,619,596 | A | * | 4/1997 | Iwaki et al. .................. | 382/278 |
| 5,809,171 | A | * | 9/1998 | Neff et al. ................... | 382/209 |
| 5,890,808 | A | * | 4/1999 | Neff et al. ................... | 382/209 |
| 5,892,838 | A | * | 4/1999 | Brady ......................... | 382/115 |
| 5,933,546 | A | * | 8/1999 | Stone .......................... | 382/278 |
| 5,982,930 | A | * | 11/1999 | Neff et al. ................... | 382/209 |
| 6,137,893 | A | * | 10/2000 | Michael et al. ............. | 382/103 |
| 6,292,583 | B1 | * | 9/2001 | Maruo ........................ | 382/149 |
| 6,373,979 | B1 | * | 4/2002 | Wang ......................... | 382/165 |
| 6,574,366 | B1 | * | 6/2003 | Fan ............................. | 382/201 |
| 6,687,528 | B2 | * | 2/2004 | Gupta et al. ................. | 600/410 |
| 6,856,696 | B1 | * | 2/2005 | Ajioka ........................ | 382/173 |
| 6,904,151 | B2 | * | 6/2005 | Deguillaume et al. ...... | 382/100 |
| 2001/0036302 | A1 | * | 11/2001 | Miller ........................ | 382/128 |
| 2002/0057838 | A1 | * | 5/2002 | Steger ......................... | 382/197 |
| 2003/0039405 | A1 | * | 2/2003 | Oosawa ...................... | 382/294 |
| 2003/0113000 | A1 | * | 6/2003 | Hyoki et al. ................. | 382/112 |
| 2003/0133589 | A1 | * | 7/2003 | Deguillaume et al. ...... | 382/100 |
| 2004/0051795 | A1 | * | 3/2004 | Ajioka ........................ | 348/239 |
| 2004/0141632 | A1 | * | 7/2004 | Miyake et al. .............. | 382/100 |
| 2005/0111738 | A1 | * | 5/2005 | Iizuka ......................... | 382/190 |

* cited by examiner

*Primary Examiner*—Samir A. Ahmed
*Assistant Examiner*—Tsung-Yin Tsai
(74) *Attorney, Agent, or Firm*—Oblon, Spivak, McClelland, Maier & Neustadt, L.L.P.

(57) ABSTRACT

An image matching system, program, and method are provided to match images with high precision. The system includes a low resolution transform unit for performing Hough transform on each of registered images and an input match image and generating transformed registered images and a transformed match image having a low resolution; a correlation value generation unit for performing correlation between each of the transformed registered images and the transformed match image; a match coverage determination unit for determining the registered images for match processing corresponding to the top predetermined number of transformed registered images having high correlation degrees based on results of the correlation processing; and a matching unit for performing match processing based on the transformed registered images and the transformed match image having a high resolution generated by performing Hough transform on each of the registered images for match processing and the match image.

17 Claims, 10 Drawing Sheets

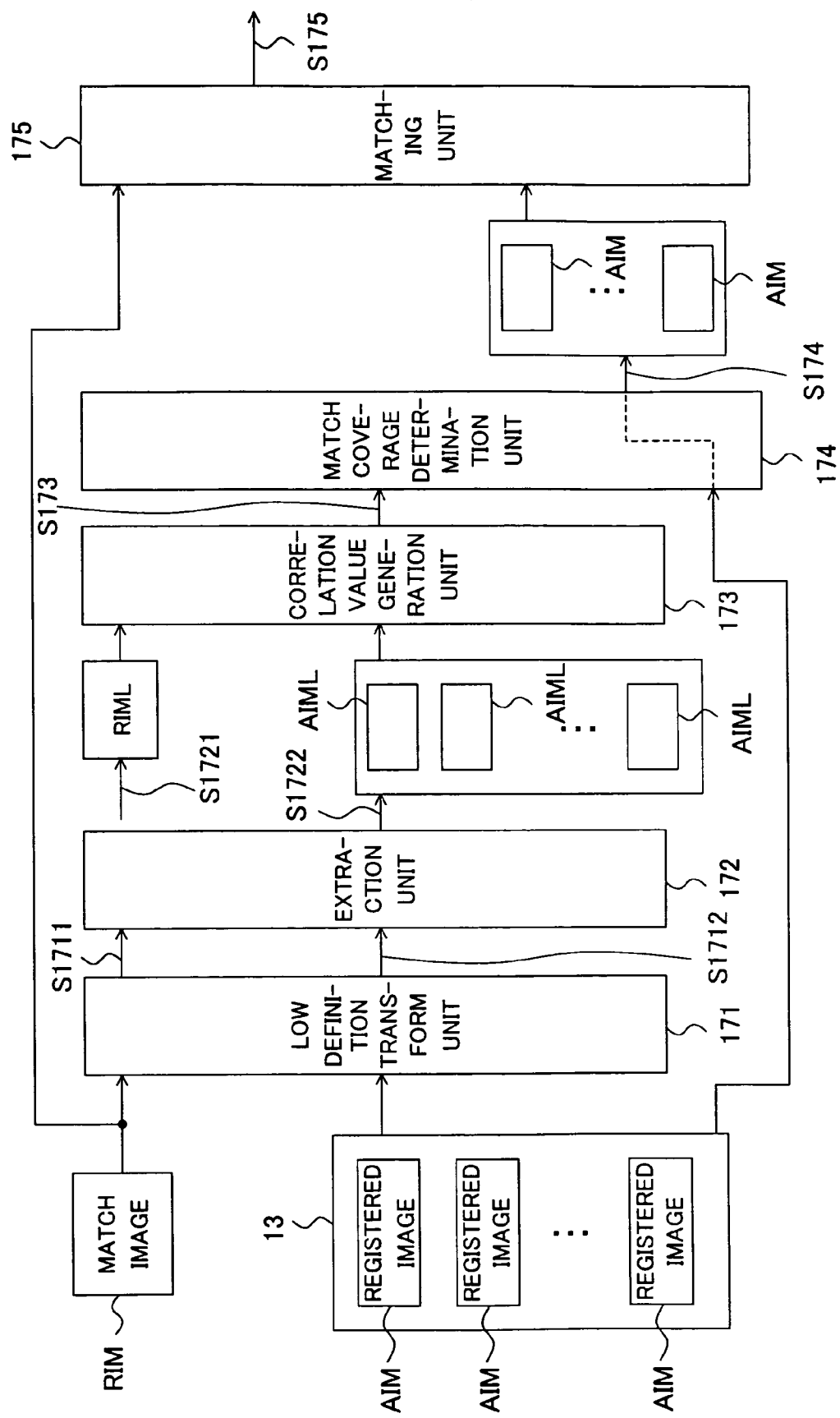

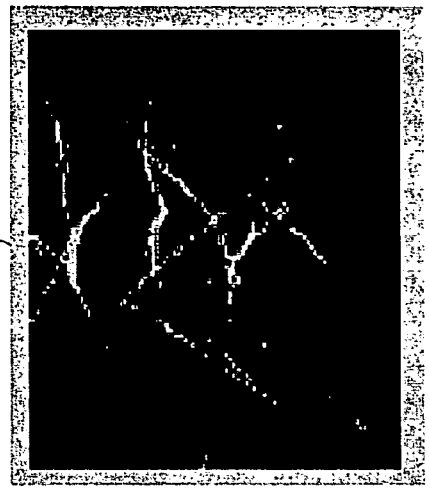
FIG. 5E S1721
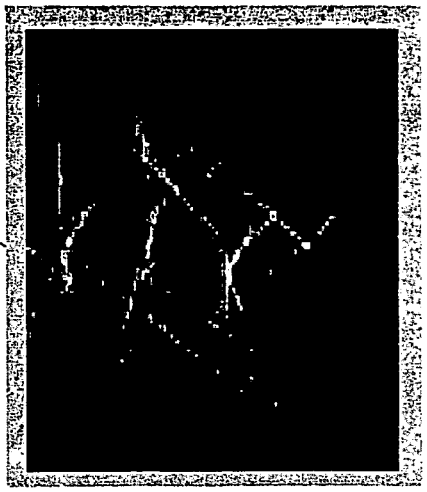
FIG. 5F S1722
FIG. 5C S1711
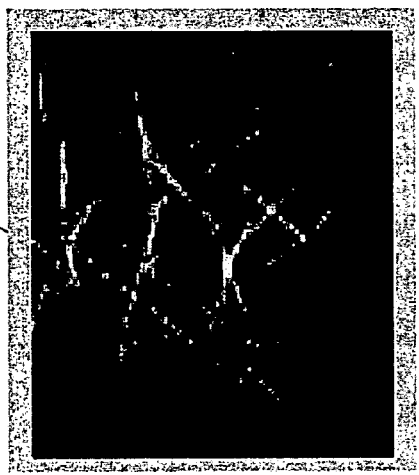
FIG. 5D S1712
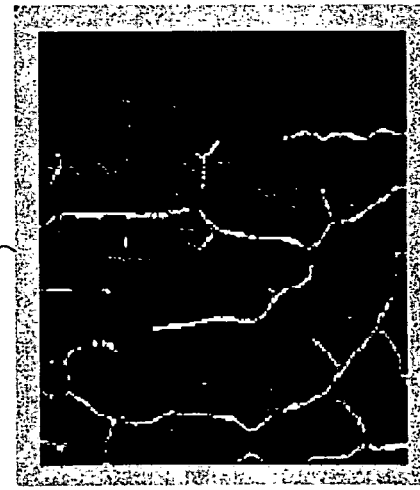
FIG. 5A RIM
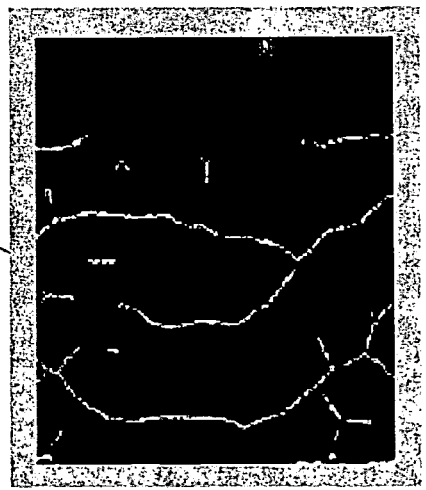
FIG. 5B AIM

IMAGE MATCHING SYSTEM, PROGRAM, AND IMAGE MATCHING METHOD

BACKGROUND OF THE INVENTION

1. Field of the Invention

The present invention relates to an image matching system for matching, for example, two blood vessel images, fingerprint images, still images, moving images, and other images and a program and an image matching method for the same.

2. Description of the Related Art

As systems for matching based on image information, various image matching systems are known. For example, Japanese Unexamined Patent Publication No. 2000-194862 discloses an information processing apparatus for comparing for example registered images against an image for comparison, that is, a "match image", in a predetermined positional relationship to calculate correlation values and matching a registered image against the match image based on the correlation values or an information processing apparatus generating correlation values by processing in units of pixels at the time of generating the correlation values.

In the above image matching system, however, it is necessary to judge for example with which registered image among a plurality of registered images stored in a data base the match image coincides. At this time, the match image is successively matched against the registered images in the data base, but it suffers from the disadvantage that the larger the number of the registered images stored in the data base, the longer the match processing time. Improvement is desired.

SUMMARY OF THE INVENTION

An object of the present invention is to provide an image matching system able to shorten the match processing time even when the number of the images for the match processing increases and a program and image matching method for the same.

To attain the above object, according to a first aspect of the present invention, there is provided an image matching system including: a transforming unit for performing Hough transform processing on each of a plurality of registered images and a match image and generating a plurality of transformed registered images and a transformed match image having a first resolution (definition); a correlation processing unit for performing correlation processing between each of the plurality of transformed registered images and the transformed match image generated by the transforming unit; a determining unit for determining registered images for match processing corresponding to the top predetermined number of transformed registered images having high correlation degrees based on the results of the correlation processing by the correlation processing unit; and a match processing unit for performing match processing of the registered images and the match image based on the transformed registered images and the transformed match image having a second resolution (definition) higher than the first resolution (definition) generated by performing the Hough transform processing on each of the registered images for match processing determined by the determining unit and the match image.

The mode of operation of the image matching system of the first aspect of the present invention is as follows. The transforming unit performs Hough transform processing on each of a plurality of registered images and a match image and generates a plurality of transformed registered images and a transformed match image having a first resolution (definition) . The correlation processing unit performs the correlation processing between each of the plurality of transformed registered images and the transformed match image generated by the transforming unit. The determining unit determines the registered images for match processing corresponding to the top predetermined number of transformed registered images having high correlation degrees based on the results of the correlation processing by the correlation processing unit. The match processing unit performs the match processing between the predetermined number of registered images and the match image based on the transformed registered images and the transformed match image having a second resolution (definition) higher than the first resolution (definition) generated by performing the Hough transform processing on each of the registered images for match processing determined by the determining unit and the match image.

Further, to attain the above objects, according to a second aspect of the present invention, there is provided an image matching system including: a transforming unit for performing Hough transform processing on each of a plurality of registered images and a match image and generating a plurality of transformed registered images and a transformed match image having a first resolution (definition); a correlation processing unit for performing correlation processing between each of the plurality of transformed registered images and the transformed match image generated by the transforming unit; a determining unit for determining a sequence of correlation degrees of the transformed registered images and the transformed match image as the sequence of the match processing of the registered images corresponding to the transformed registered images and the match image based on the results of the correlation processing by the correlation processing unit; and a match processing unit for performing correlation processing on the transformed registered images and the transformed match image having a second resolution (definition) higher than the first resolution (definition) generated by performing the Hough transform processing on each of the registered images and the match image in the sequence determined by the determining unit and performing the match processing of the registered images and the match image based on the results of the correlation processing.

Further, to attain the above objects, according to a third aspect of the present invention, there is provided a program to be run (executed) by (in) an information processing apparatus, including: a first routine for performing Hough transform processing on each of a plurality of registered images and a match image and generating a plurality of transformed registered images and a transformed match image having a first resolution (definition); a second routine for performing correlation processing between each of the plurality of transformed registered images and the transformed match image generated by the first routine; a third routine for determining registered images for match processing corresponding to the top predetermined number of transformed registered images having high correlation degrees based on the results of the correlation processing by the second routine; and a fourth routine for performing match processing of the registered images and the match image based on the transformed registered images and the transformed match image having a second resolution (definition) higher than the first resolution (definition) generated by performing Hough transform processing on each of the registered images for match processing determined by the determining unit and the match image.

Further, to attain the above objects, according to a fourth aspect of the present invention, there is provided a program to be run (executed) by (in) an information processing apparatus, including: a first routine for performing Hough transform processing on each of a plurality of registered images and a match image and generating a plurality of transformed registered images and a transformed match image having a first resolution (definition); a second routine for performing correlation processing between each of the plurality of transformed registered images and the transformed match image generated by the first routine; a third routine for determining a sequence of correlation degrees of the transformed registered images and the transformed match image as the sequence of the match processing of the registered images corresponding to the transformed registered images and the match image based on the results of the correlation processing by the second routine; and a fourth routine for performing correlation processing on the transformed registered images and the transformed match image having a second resolution (definition) higher than the first resolution (definition) generated by performing Hough transform processing on each of the registered images and the match image in the sequence determined in the third routine and performing the match processing of the registered images and the match image based on the results of the correlation processing.

Further, to attain the above objects, according to a fifth aspect of the present invention, there is provided an image matching method of an image matching system, including: a first step of performing Hough transform processing on each of a plurality of registered images and a match image and generating a plurality of transformed registered images and a transformed match image having a first resolution (definition); a second step of performing correlation processing between each of the plurality of transformed registered images and the transformed match image generated at the first step; a third step of determining the registered images for match processing corresponding to the top predetermined number of transformed registered images having high correlation degrees based on results of the correlation processing at the second step; and a fourth step for performing match processing of the registered images and the match image based on the transformed registered images and the transformed match image having a second resolution (definition) higher than the first resolution (definition) generated by performing Hough transform processing on each of the registered images for match processing determined at the third step and the match image.

Further, to attain the above object, according to a sixth aspect of the present invention, there is provided an image matching method of a image matching system, including: a first step of performing Hough transform processing on each of a plurality of registered images and a match image and generating a plurality of transformed registered images and a transformed match image having a first resolution (definition); a second step of performing correlation processing between each of the plurality of transformed registered images and the transformed match image generated at the first step; a third step of determining a sequence of correlation degrees of the transformed registered images and the transformed match image as the sequence of the match processing of the registered images corresponding to the transformed registered images and the match image based on the results of the correlation processing at the second step; and a fourth step of performing correlation processing on the transformed registered images and the transformed match image having a second resolution (definition) higher than the first resolution (definition) generated by performing the Hough transform processing for each of the registered images and the match image in the sequence determined at the third step, and performing match processing of the registered images and the match image based on the results of the correlation processing.

According to the present invention, an image matching system able to shorten the match processing time even when the number of images for match processing increases and a program and an image matching method can be provided.

BRIEF DESCRIPTION OF THE DRAWINGS

These and other objects and features of the present invention will become clearer from the following description of the preferred embodiments with reference to the accompanying drawings, in which:

FIG. 2 is a software like functional block diagram of the image matching system shown in FIG. 1;

FIGS. 5A to 5F are views for explaining the image transform processing of the image matching system shown in FIG. 1;

FIGS. 9A and 9B are views for explaining a correlation emphasis image G(p, q), in which FIG. 9A is a perspective view of a correlation emphasis image G(p, q) and FIG. 9B is a projection view of the correlation emphasis image G(p, q) to a p-q plane.

DESCRIPTION OF THE PREFERRED EMBODIMENTS

Figure 1:
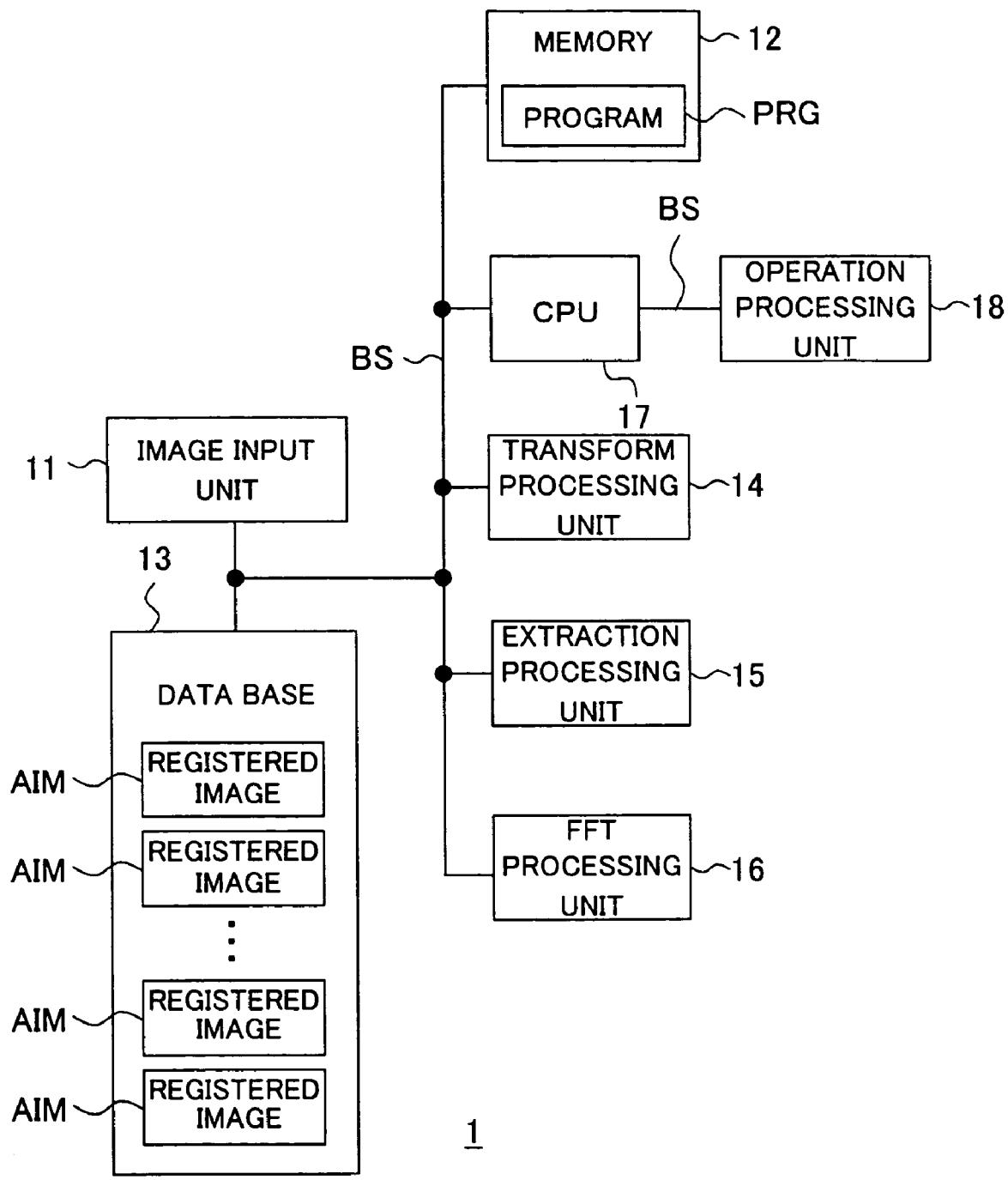
FIG. 1 is a hardware like functional block diagram of an image matching system according to an embodiment of the present invention.

Below, preferred embodiments will be described with reference to the accompanying drawings.

When matching a plurality of registered images stored in a memory device such as forming a data base against a match image, an image matching system (information processing apparatus) according to an embodiment of the present invention first performs Hough transform processing on each of the plurality of registered images and match image, generates a plurality of transformed registered images and a transformed match image having a low resolution (definition), and determines the registered images for match processing corresponding to the top predetermined number of transformed registered images having high correlation degrees based on results of the correlation processing between each of the plurality of transformed registered images and the transformed match image. The image matching system performs match processing of the registered images and the match image based on the transformed registered images and the transformed match image having a high resolution (definition) generated by performing Hough transform processing on each of the determined predetermined number of registered images for match processing and the match image.

Below, a detailed explanation will be given of an image matching system according to an embodiment of the present invention by referring to the drawings.

FIG. 1 is a hardware like functional block diagram of an image matching system according to an embodiment of the present invention. An image matching system (also referred to as an information processing apparatus) 1 according to the present embodiment has an image input unit 11, a memory 12, a data base 13, a transform processing unit 14, an extraction processing unit 15, a fast Fourier transform (FFT) processing unit 16, a central processing unit (CPU) 17, and an operation processing unit 18.

The image input unit 11, the memory 12, the data base 13, the transform processing unit 14, the extraction processing unit 15, the FFT 16, the CPU 17, and the operation processing unit 18 are connected by a bus BS. For example, the bus BS is a bus able to transfer data serially or in parallel.

The image input unit 11 is an input unit for receiving as input images from the outside. For example, the image input unit 11 receives a registered image AIM at the time of registration and receives a match image RIM at the time of matching. The registered images AIM correspond to the registered images according to the present invention, while the match image RIM corresponds to the match image according to the present invention.

The memory 12 is used as a working space of for example the CPU 17. The memory 12 stores for example a program PRG including the functions according to the present invention. The program PRG includes routines executed by for example the CPU 17 and realizing functions according to the present invention such as transform processing, correlation processing, determination processing, and match processing.

The data base 13 stores a plurality of registered images AIM as shown in for example FIG. 1 under the control of the CPU 17. Further, it also stores the match image RIM input from the image input unit 11.

The transform processing unit 14 performs the image transform processing explained later, for example, Hough transform processing, under the control of the CPU 17, and outputs the processing result to the CPU 17. The transform processing unit 14 preferably uses a dedicated circuit configured by hardware in order to perform the image transform processing at a high speed. The extraction processing unit 15 performs the extraction processing explained later (also referred to as "masking processing") under the control of the CPU 17 and outputs the processing result to the CPU 17. The extraction processing unit 15 preferably uses a dedicated circuit configured by hardware in order to perform the extraction processing at a high speed.

The FFT processing unit 16 performs for example two-dimensional Fourier transform processing (and/or inverse two-dimensional Fourier transform processing) based on images on the data base 13 and the memory 12 under the control of the CPU 17 and outputs the processing result to the CPU 17 etc. For example, the FFT processing unit 16 performs Fourier transform processing at a high speed, so preferably uses a dedicated circuit configured by hardware.

The operation processing unit 18 performs predetermined processing for unlocking an electronic key where for example a registered image AIM and the match image RIM coincide based on the result of the processing of the CPU 17 explained later.

FIG. 2 is a software like functional block diagram of the image matching system shown in FIG. 1. The CPU 17 controls the entire apparatus. Further, the CPU 17 realizes functions according to the present invention, for example, a low resolution (definition) transform unit 171, an extraction unit 172, a correlation value generation unit 173, a match coverage determination unit 174, and a matching unit 175 by running the program PRG. The low resolution transform unit 171 corresponds to the transforming unit according to the present invention, the match coverage determination unit 174 corresponds to the determining unit according to the present invention, and the matching unit 175 corresponds to the match processing unit according to the present invention.

The low resolution (definition) transform unit 171 performs image transform processing, for example, Hough transform processing, on each of the plurality of registered images AIM and the match image RIM and generates a plurality of transformed registered images and a transformed match image having a first resolution (definition), for example, a low resolution (definition) lower than the high resolution (definition) explained later. The low resolution transform unit 171 makes the transform processing unit 14 performing for example hardware-like dedicated image transform processing perform image transform processing. In more detail, the low resolution transform unit 171 performs image transform processing based on the match image RIM and outputs the processing result as a signal S1711. Further, the low resolution transform unit 171 performs image transform processing based on a plurality of registered images AIM and outputs the processing result as a signal S1712.

Figure 3A:
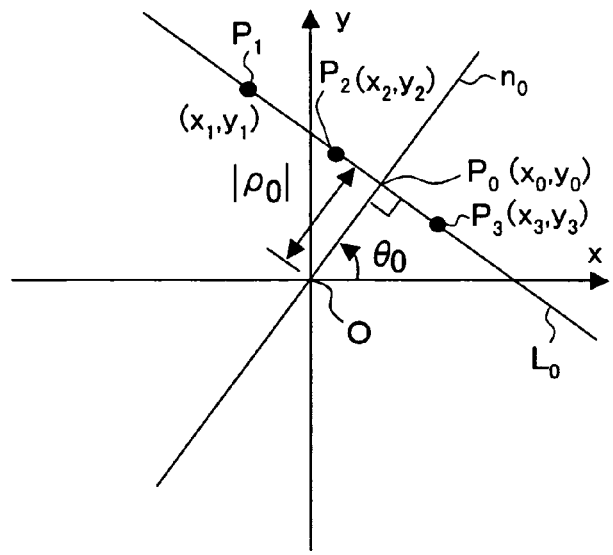
FIGS. 3A and 3B are views for explaining the operation of image transform processing of the image matching system shown in FIG. 2.
Figure 3B:
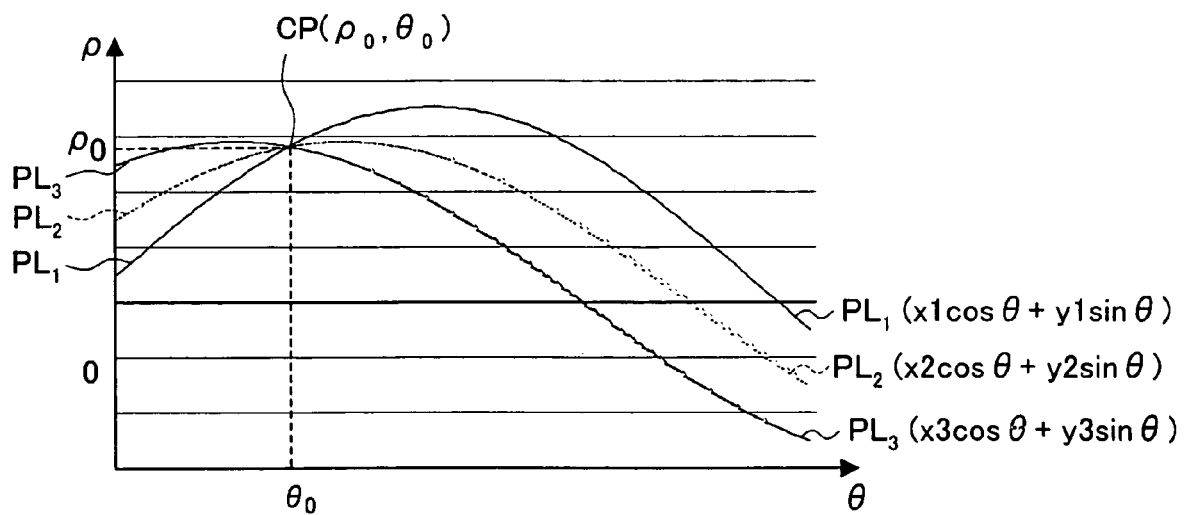

FIGS. 3A and 3B are views for explaining the operation of the image transform processing of the image matching system shown in FIG. 2. The image matching system 1 performs for example Hough transform processing as the image transform processing. Below, Hough transform processing will be explained. The low resolution (definition) transform unit 171 performs image transform processing based on for example a distance from a reference position in an image of each of a plurality of registered images AIM and the match image RIM and an angle formed by a straight line passing through the reference position and a reference axis including the reference position and generates the transformed registered images and the transformed match image in the two dimensional domain prescribed by the distance and angle. In more detail, the low resolution transform unit 171 performs image processing of transform points in the image to patterns of curves based on a distance $\rho_0$ from the reference position to the shortest point $P_0$ to a straight line $L_0$ passing through the point in the image and an angle $\theta_0$ formed by a straight line $n_0$ passing through the reference position O and the shortest point $P_0$ and a reference axis including the reference position O for each of the registered images AIM and the match image RIM and transforming linear components in the image to patterns of a plurality of superimposed curves and generates the transformed registered images and the transformed match image.

For a simpler explanation, as shown in FIG. 3A, assume that a straight line $L_0$ and a point P1 (x1, y1), a point P2(x2, y2), and a point P3(x3, y3) on the straight line $L_0$ exist on an x-y plane. When assuming that a straight line passing through an origin (reference position) O and vertical to the straight line $L_0$ is $n_0$, for example, the straight line $n_0$ and a reference axis comprised of an x-axis have a relationship of the angle $\theta_0$, and there is a relationship of a distance $|\rho_0|$ from the origin O to the straight line $L_0$. Here, $|\rho_0|$ indicates an absolute value of $\rho_0$. The straight line $L_0$ can be expressed by a parameter such as $(\rho_0, \theta_0)$. The image transform processing according to the present invention with respect to a coordinate (x, y) on the x-y plane is defined by Equation (1).

$$\rho = x \cdot \cos\theta + y \cdot \sin\theta \qquad (1)$$

When the transform processing shown in Equation (1) is carried out for each of the points P1, P2, and P3, they are transformed to curves on a $\rho$–$\theta$ domain as shown in FIG. 3B. In more detail, the transform processing for transforms the point P1(x1, y1) to a curve PL1(x1·cos $\theta$+y1·sin $\theta$), the point P2(x2, y2) to a curve PL2(x2·cos $\theta$+y2·sin $\theta$), and the point P3(x3, y3) to a curve PL3(x3·cos $\theta$+y3·sin $\theta$). The patterns of these curves $PL_1$, $PL_2$, and $PL_3$ cross at cross points CP($\rho_0$, $\theta_0$) on the $\rho$–$\theta$ domain. On the $\rho$–$\theta$ domain, the cross point CP($\rho_0$, $\theta_0$) corresponds to the linear component $L_0$ on the x-y plane. Conversely, as shown in FIG. 3A, the linear component $L_0$ on the x-y plane corresponds to the cross point CP of patterns of curves $PL_1$, $PL_2$, and $PL_3$ on the $\rho$–$\theta$ domain.

As explained above, the digitalized image transform processing is carried out. It can be decided which linear component is dominant in the x-y plane before transform according to the degree of superimposition of patterns of curves on the $\rho$–$\theta$ domain as the processing result. The rotation and parallel movement of the image in this x-y plane correspond to parallel movements in a $\theta$ direction and a $\rho$ direction in the $\rho$–$\theta$ domain after image transform processing.

Figure 4C:
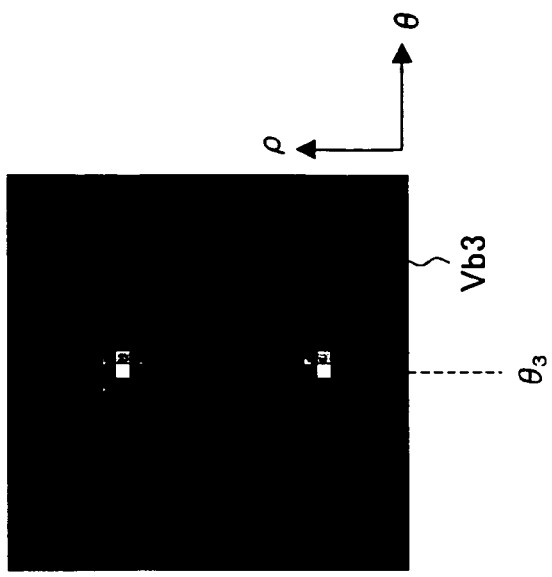
FIGS. 4A to 4C are views for explaining the image transform processing of the image matching system shown in FIG. 1.
Figure 4B:
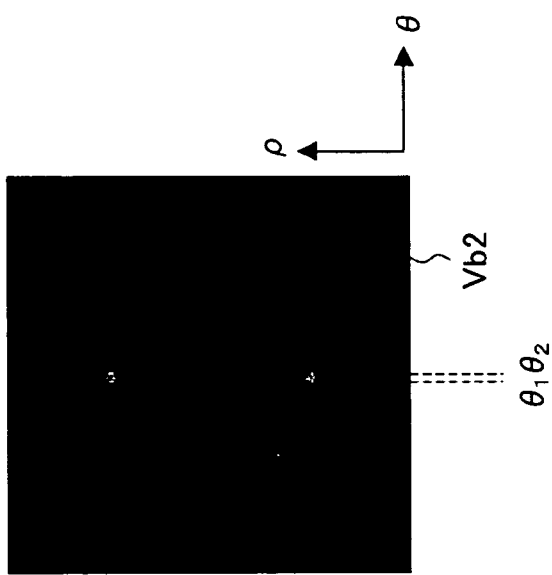
Figure 4A:
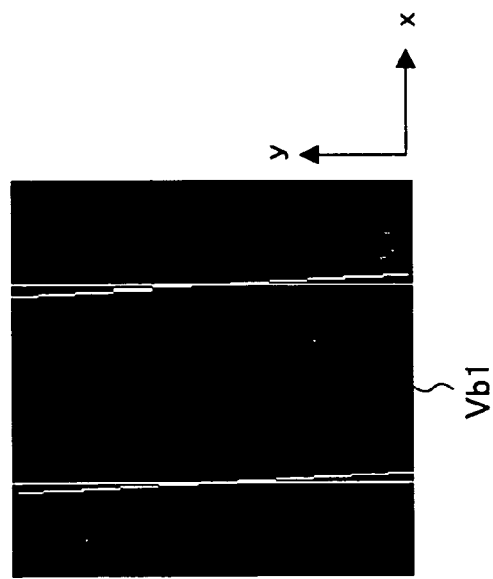

FIGS. 4A and 4B are views for explaining the image transform processing of the image matching system shown in FIG. 1. Next, an explanation will be given of the relationship between the resolution of the image transform processing, in more detail the Hough transform processing, and the processing speed by referring to the drawings. To what degree a straight line on the x-y plane of the image is finely sectioned as parameters is determined according to the size of the $\rho$–$\theta$ domain (also referred to as the parameter domain) generated by the image transform processing according to the present embodiment. The larger the size of the parameter domain, the finer the straight line can be sectioned, so the higher the resolution by that. For example, as the Hough transform processing, based on an image vb1 including a straight line having a rotation angle shift shown in FIG. 4A, the image transform processing was carried out with a parameter domain size of a high resolution (for example 180×180 pixels). As a result, an image vb2 shown in FIG. 4B is generated. Further, as the Hough transform processing, based on an image vb1 including a straight line having a rotation angle shift shown in FIG. 4A, the image transform processing was carried out with a parameter domain size of a low resolution (definition), for example, 30×30 pixels. As a result, an image vb3 shown in FIG. 4C is generated.

When comparing the image vb2 and the image vb3, in the image vb2 having a high resolution shown in FIG. 4B, the straight lines having an angle shift before the image transform are classified into other $\theta$ parameters ($\theta_1$, $\theta_2$), while in the image vb3 having a low resolution shown in FIG. 4C, they are classified as the same $\theta$ parameter ($\theta_3$). The processing speed of the image transform processing according to the present invention and the processing speed of the match processing between images after the transform depend upon the size of the parameter domain. In more detail, for example, the larger the size of the parameter domain, that is, the higher the resolution, the longer the processing time and the larger the processing load. The smaller the size of the parameter domain, that is, the lower the resolution (definition), the shorter the processing time and the smaller the processing load. For this reason, in the image matching system according to the present invention, when matching between the input match image RIM and the plurality of registered images AIM stored in the memory 12, first, the registered images for match processing corresponding to the predetermined number of transformed images having high correlation degrees are determined based on the result of calculating the correlation degree in the parameter domain having a low resolution (definition), then the image transform processing of a high resolution (definition) is carried out for the registered images and the match image and the match processing is carried out, to thereby increase the processing speed.

FIGS. 5A to 5F are views for explaining the image transform processing of the image matching system shown in FIG. 1. The low resolution (definition) transform unit 171 performs for example image transform processing for the match image RIM shown in FIG. 5A, generates the image S1711 shown in FIG. 5C, performs the image transform processing for the registered image AIM shown in FIG. 5B, and generates the image S1712 shown in FIG. 5D. Each pixel in the images S1711 and S1712 is set to a value in accordance with degree of superimposition of patterns of curves. In the present embodiment, images shown by a predetermined gradation are displayed so as to be whiter as the degree of superimposition of patterns of curves is higher.

The extraction unit 172 extracts a region in which the degree of superimposition of patterns of curves in one image is a previously set threshold value or more for each of the transformed registered images and the transformed match image. Specifically, the extraction unit 172 extracts a region in which the degree of superimposition of patterns of curves in one image is the previously set threshold value or more based on the image S1711 shown in FIG. 5C to generate an image S1721 shown in FIG. 5E and outputs the same to the correlation value generation unit 173. Further, the extraction unit 172 extracts a region in which the degree of superimposition of patterns of curves in one image is the previously set threshold value or more based on the image S1712 shown in FIG. 5D to generate an image S1722 shown in FIG. 5F and outputs the same to the correlation value generation unit 173.

In the present embodiment, the match image RIM and the registered images AIM are processed by the low resolution (definition) transform unit 171 and the extraction processing unit 172 to generate the image S1721 as the transformed match image RIML having a low resolution (definition) and the transformed registered images AIML having low resolutions, but it is also possible to generate a transformed match image RIML having a low resolution and transformed registered images AIML having low resolutions without the processing of the extraction processing unit 172.

By performing this extraction processing (masking processing), for example, noise components different from the linear components on the x-y domain of the registered images AIM and the match image RIM, for example, point components, are eliminated. The extraction unit 172 makes the extraction processing unit 15 perform hardware-like dedicated extraction processing (masking processing) as the above extraction processing.

The correlation value generation unit 173 performs correlation processing of each of the signals S1722 as the plurality of transformed registered images AIML and the signal S1721 of the transformed match image RIM. Specifically, the correlation value generation unit 173 performs comparison processing for each of the different plurality of positional relationships between the signal S1721 as the transformed match image RIML and the signals S1722 as the transformed registered images AIML shown in FIGS. 5E and 5F, generates similarities as the correlation values according to results of the comparison processing, and outputs the match results as the signal S173 to the match coverage determination unit 174.

Figure 6A:
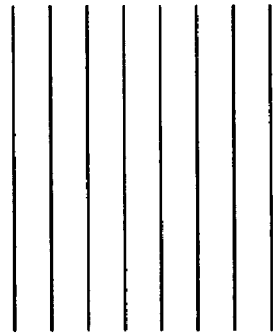
FIGS. 6A to 6C are views for explaining an embodiment of the operation of a correlation value generation unit shown in FIG. 2.
Figure 6B:
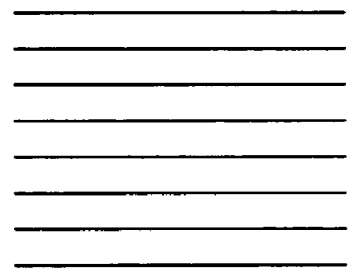
Figure 6C:
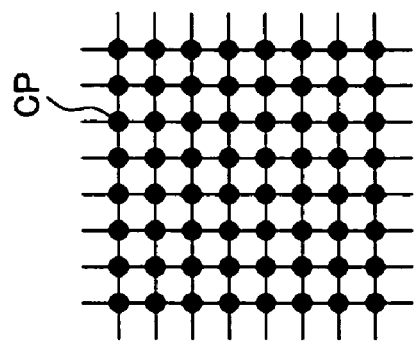

FIGS. 6A to 6C are views for explaining an embodiment of the operation of the correlation value generation unit 173 shown in FIG. 2. Specifically, the correlation value generation unit 173 calculates a similarity Sim by Equation (2) where two images are f1(m, n) and f2(m, n) and outputs the calculation result as S173.

$$Sim(f1, f2) = \frac{\sum_{m=0}^{M-1}\sum_{n=0}^{N-1} f1(m,n)f2(m,n)}{\sqrt{\left\{\sum_{m=0}^{M-1}\sum_{n=0}^{N-1} f1(m,n)^2\right\}}\sqrt{\left\{\sum_{m=0}^{M-1}\sum_{n=0}^{N-1} f2(m,n)^2\right\}}} \quad (2)$$

The correlation value generation unit 173 generates a similarity in accordance with the number of the cross points CP of two images as shown in FIG. 6C when generating the correlation degree (similarity) of two images including linear components (also referred to as "line shapes") shown in for example FIGS. 6A and 6B. Here, for a simple explanation, the linear components are indicated by black pixels having bit values "1", and the other components are indicated by white pixels having bit values "0".

The match coverage determination unit 174 determines the registered images AIM for match processing corresponding to the top predetermined number of transformed registered images AIML having high correlation degrees based on the signal S173 indicating the correlation degree generated by the correlation value generation unit 173 and outputs the signal S174 indicating the determined registered images AIM to the matching unit 175.

The matching unit 175 performs the match processing between the registered images and the match image based on the transformed registered images and the transformed match image having a second resolution higher than the first resolution generated by performing Hough transform processing for each of the registered images AIM for match processing determined by the match coverage determination unit 174 and the match image RIM and outputs the signal S175 indicating the processing result. In the present embodiment, the matching unit 175 performs the match processing by performing correlation processing after symmetric phase only matched filter (SPOMF) and Hough transform processing.

The matching unit 175 performs Fourier transform processing for each of the registered images AIM for match processing determined by the match coverage determination unit 174 and the match image RIM and performs match processing between the registered images and the match image based on the transformed registered images and the transformed match image having a second resolution higher than the first resolution generated by performing the Hough transform processing on each of the registered images and the match image subjected to position correction processing based on the phase components as the results of the Fourier transform processing.

Further, the matching unit 175 extract a region in which the degree of superimposition of patterns of curves in one image is the previously set threshold value or more for each of the transformed registered images and the transformed match image having a high resolution and performs the match processing between the registered images and the match image based on the patterns in the extracted region.

The matching unit 175 performs comparison processing on each of the different plurality of position relationships in the transformed registered images and the transformed match image, generates similarities as the correlation values according to the results of the comparison processing, and performs the match processing for the registered images and the match image based on the generated similarities. Below, an explanation will be given of the matching unit 175 according to the present embodiment by referring to the drawings.

Figure 7:
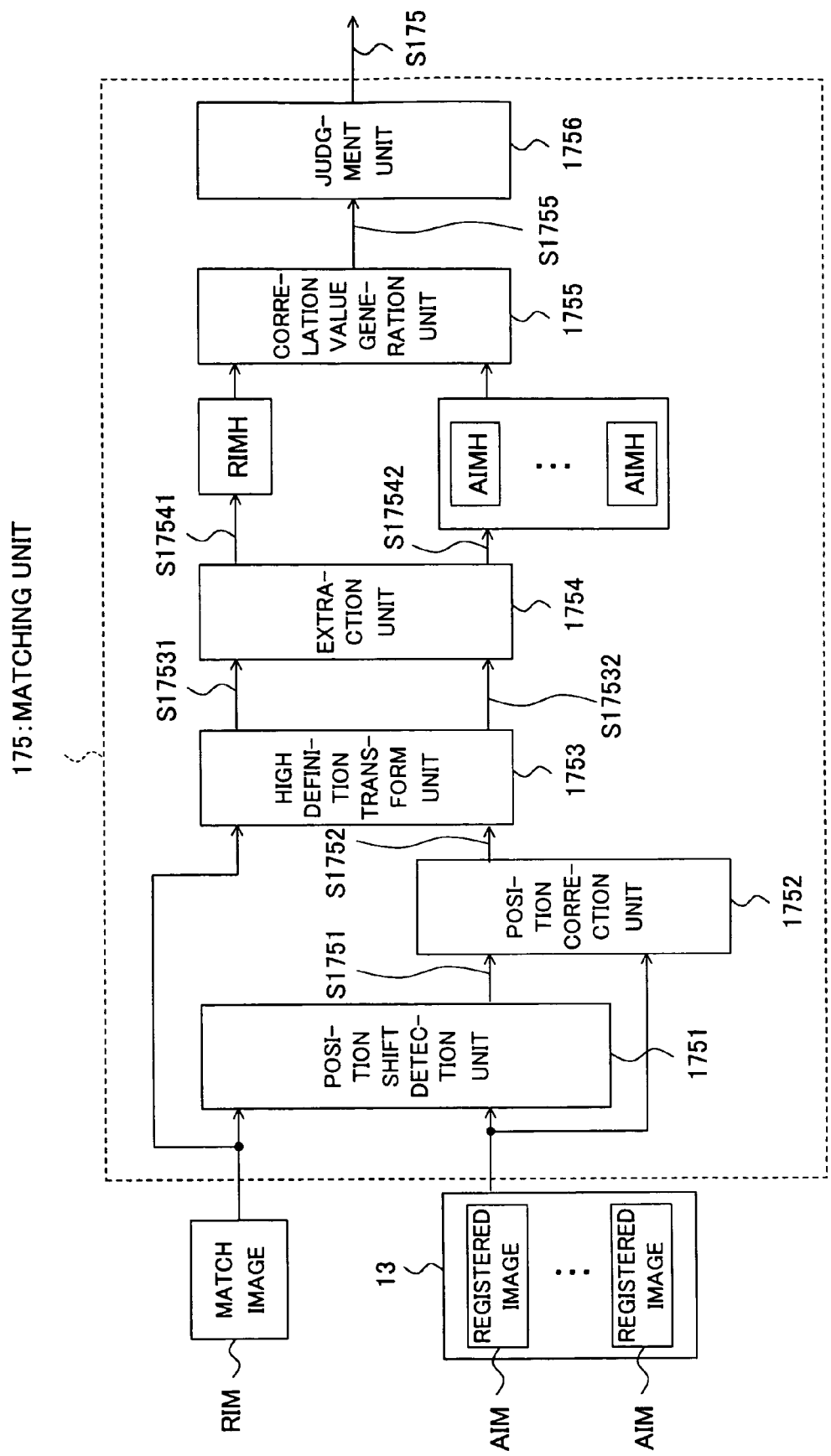
FIG. 7 is a functional block diagram of an embodiment of a matching unit shown in FIG. 2.

FIG. 7 is a functional block diagram according to an embodiment of the matching unit 175 shown in FIG. 2. The comparison unit 175 has a position shift detection unit 1751, a position correction unit 1752, a high resolution transform unit 1735, an extraction unit 1754, a correlation value generation unit 1755, and a judgment unit 1756.

The position shift detection unit 1751 performs SPOMF processing on the registered images AIM and the match image RIM, detects the position shift of each image based on the processing results, and outputs a signal S1751 indicating the detection results.

Figure 8:
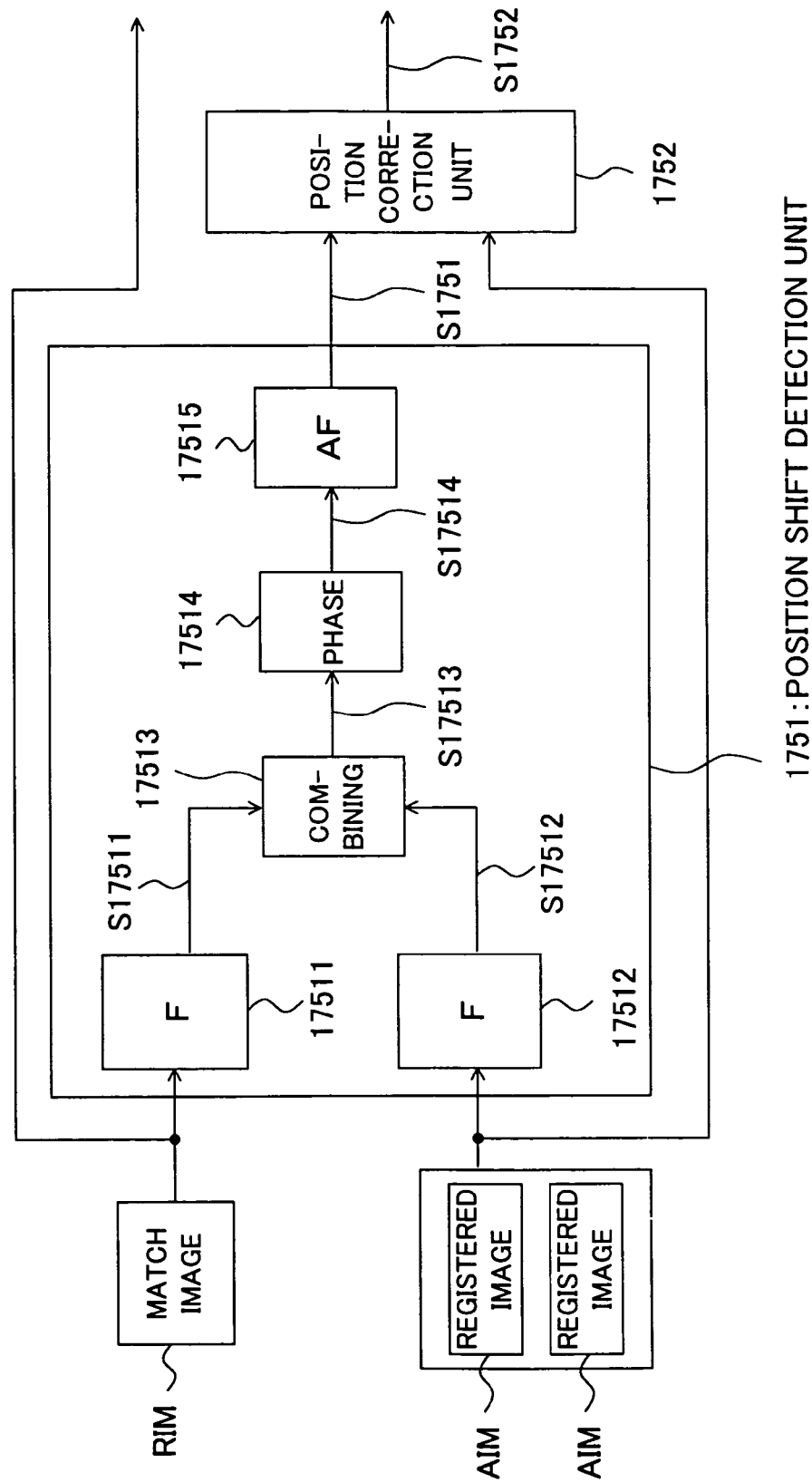
FIG. 8 is a functional block diagram of a position correction unit shown in FIG. 7.

FIG. 8 is a functional block diagram of the position shift detection unit 1751 shown in FIG. 7. The position shift detection unit 1751 has Fourier transform units (F) 17511 and 17512, a combining unit 17513, a phase extraction unit 17514, and an inverse Fourier transform unit 17515.

The Fourier transform unit (F) 17511 performs the Fourier transform processing as shown in Equation (3) where the match image RIM is an image pA(m, n) of m×n pixels, generates Fourier image data X(u, v), and outputs the same as a signal S17511 to the combining unit 17513. The Fourier transform unit (F) 17512 performs the Fourier transform processing as shown in Equation (4) where the registered images AIM are images pB(m, n) of m×n pixels, generates Fourier image data Y(u, v), and outputs the same as a signal S17512 to the combining unit 17513.

$$X(u,v) = \sum_{m=0}^{N-1}\sum_{n=0}^{N-1} pA(m,n)e^{-j2\pi((mu+nv)/N)} = C(u,v)e^{j\theta(u,v)} \quad (3)$$

$$Y(u,v) = \sum_{m=0}^{N-1}\sum_{n=0}^{N-1} pB(m,n)e^{-j2\pi((mu+nv)/N)} = D(u,v)e^{j\phi(u,v)} \quad (4)$$

The Fourier image data X(u, v) is comprised of an amplitude spectrum C(u, v) and a phase spectrum θ(u, v) as shown in Equation (3), while the Fourier image data Y(u, v) is comprised of an amplitude spectrum D(u, v) and a phase spectrum Φ(u, v) as shown in Equation (4).

The combining unit 17513 combines the data X(u, v) and Y(u, v) as signals S17511 and S17512 generated at the Fourier transform units 17511 and 17512 to perform the correlation processing. For example, the combining unit 17513 generates X(u, v)×Y*(u, v) and outputs the same as a signal S17513 to the phase extraction unit 17514. Here, Y*(u, v) is a complex conjugate of Y(u, v).

The phase extraction unit 17514 eliminates the amplitude component based on the combined signal S17513 output from the combining unit 17513 to extract the phase information, and outputs the processing result as a signal S17514.

The phase extraction unit 17514 extracts a phase component Z(u, v)=exp {j(θ(u, v)−φ(u, v))} of the latter based on X(u, v)×Y*(u, v).

The extraction of the phase information is not limited to the above format. For example, it is also possible to extract the phase information based on Equations (5) and (6) based on the outputs of the Fourier transform units 17511 and 17512, then combine only the phase components as shown in Equation (7) to generate Z(u, v).

$$X'(u,v) = e^{j\theta(u,v)} \tag{5}$$

$$Y'(u,v) = e^{j\phi(u,v)} \tag{6}$$

$$Z(u,v) = X'(u,v)(Y'(u,v))^* = e^{j(\theta(u,v)-\phi(u,v))} \tag{7}$$

The inverse Fourier Transform unit (AF) 17515 performs inverse Fourier Transform processing based on the signal Z(u, v) of only the phase information as the signal S17514 output from the phase extraction unit 17514 and generates a correlation strength (emphasis) image. In more detail, the inverse Fourier transform unit 17515 performs inverse Fourier transform processing based on the signal Z(u, v) as shown in Equation (8), generates the correlation strength image G(p, q), and outputs the same as the signal S1751 to the phase correction unit 1752.

$$G(p, q) =$$

$$\sum_{u=0}^{N-1}\sum_{v=0}^{N-1}(Z(u,v))e^{j2\pi((up+vq)/N)} = \sum_{u=0}^{N-1}\sum_{v=0}^{N-1}(e^{j(\theta(u,v)-\phi(u,v))})e^{j2\pi((up+vq)/N)} \tag{8}$$

Figure 9B:
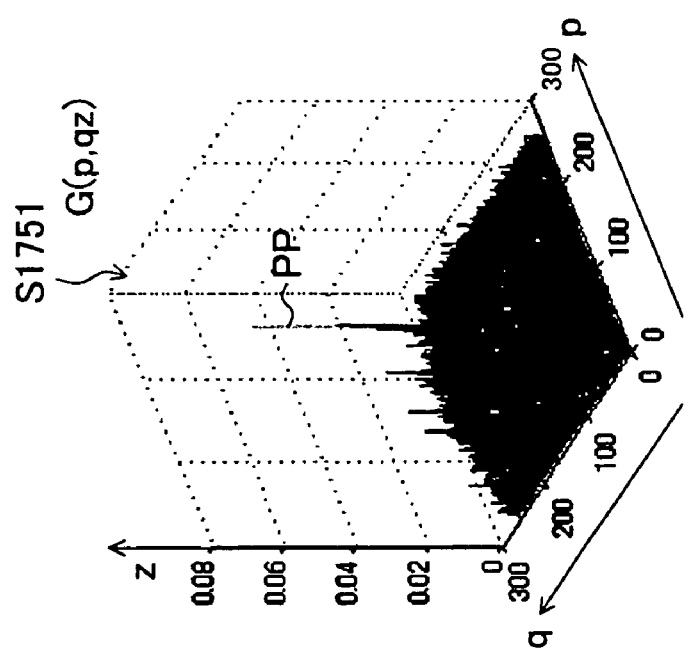
Figure 9A:
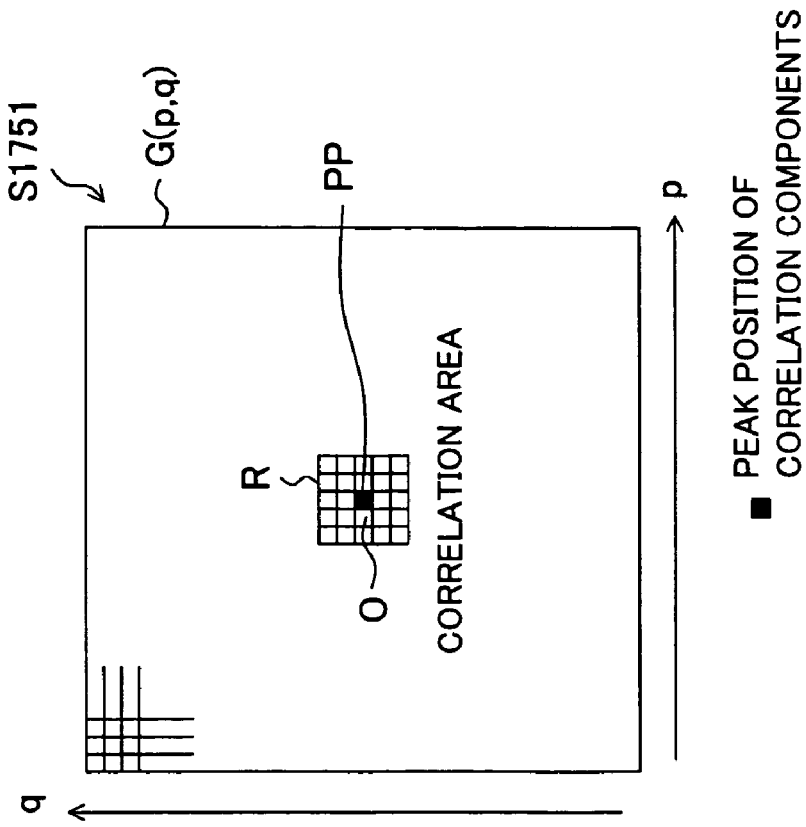

FIGS. 9A and 9B are views for explaining the correlation strength image G(p, q). FIG. 9A is a perspective view of the correlation strength image G(p, q), and FIG. 9B is a projected view of the correlation strength image G(p, q) to the p-q plane. In FIG. 9B, a z-axis shows the correlation strength at the point (p, q).

Specifically, the position shift detection unit 1751 detects a position shift based on for example the position of a peak PP in the signal S1751 as the correlation strength (emphasis) image G(p, q) shown in FIG. 9A. The signal S1751 as the correlation strength image is set so that a peak PP having a large correlation strength is formed at the image center position O of the signal S1751 as the correlation strength image as shown in FIG. 9B when there is no parallel movement shift between for example a registered image AIM and the match image RIM. Further, this is set so that when there is a parallel movement shift between a registered image AIM and the match image RIM, the peak PP is formed with a shift of exactly an amount in accordance with the parallel movement shift from the image center O thereof.

The position correction unit 1752 corrects the position shift between the match image RIM and a registered image AIM based on the signal S1751 and outputs the processing result to the high resolution (definition) transform unit 1753. In the present embodiment, the position correction unit 1752 performs the position correction processing of the registered image AIM so as to match with the match image RIM. Further, the position correction unit 1752 may perform the position correction processing so that the match image RIM matches with the registered image AIM as well. By performing this position correction processing, the judgment precision of the judgment unit 1756 explained later is raised.

The high resolution (definition) transform unit 1753 performs substantially the same image processing as that of the low resolution (definition) transform unit 171, concretely Hough transform processing. The difference resides in the point that the high resolution transform unit 1735 generates transformed registered images and the transformed match image having a second resolution (definition) higher than the transformed registered images and the transformed match image having the first resolution (definition) generated by the low resolution transform unit 171. That is, as explained above, as the Hough transform processing, the image transform processing is performed for transforming points in an image to patterns of curves and transforming the linear components in the image to patterns of a plurality of superimposed curves based on the distance from a reference position in the image of each of the registered images AIM and the match image RIM corrected by the position shift detection unit 1751 and the position correction unit 1752 to the shortest point to the straight line passing through the point in the image and the angle formed by the straight line passing through the reference position and the shortest point and the reference axis including the reference position.

Specifically, the high resolution (definition) transform unit 1753 performs Hough transform processing on the match image RIM, generates a transformed match image S17531 of a high resolution (definition), and outputs the same to the extraction unit 1754. Further, the high resolution transform unit 1753 performs Hough transform processing on the registered images AMI, generates a signal S17532 as the transformed registered images of a high resolution, and outputs the same to the extraction unit 1754.

The extraction unit 1754 has substantially the same functions as the extraction unit 172 explained above. Specifically, the extraction unit 1754 extracts a region in which the degree of superimposition of patterns of curves in one image is the previously set threshold value or more for each of the signals S17531 and S17532 as the transformed match image and the transformed registered images having the second resolution and outputs signals S17541 and S17542 as a transformed match image RIMH and transformed registered images AIMH having a high resolution.

The correlation value generation unit 1755 performs the comparison processing for each of a different plurality of positional relationships in signals S17541 and S17542 as the transformed match image RIMH and the transformed registered images AIMH having the high resolution and generates similarities as correlation degrees according to the results of the comparison processing. The correlation value generation unit 1755 has substantially the same functions as the correlation value generation unit 173, generates a similarity Sim as the correlation degree based on Equation (2), and outputs the same as the signal S1755 to the judgment unit 1756.

The judgment unit 1756 performs the match processing between the match image RIM and the registered images AIM based on the signal S1755. Specifically, the judgment unit 1756 judges that the match image RIM and a registered image AIM coincide when the signal S1755 is the previously set threshold value or more, while judges that they do not coincide when the signal S1755 is smaller than the threshold value, and outputs a signal S175 indicating the judgment result to the destination of the signal S175 and the operation processing unit 18. The operation processing unit 18 performs the predetermined processing for example for unlocking of an electronic key when for example a registered image AIM and the match image RIM coincide based on the signal S175.

Figure 10:
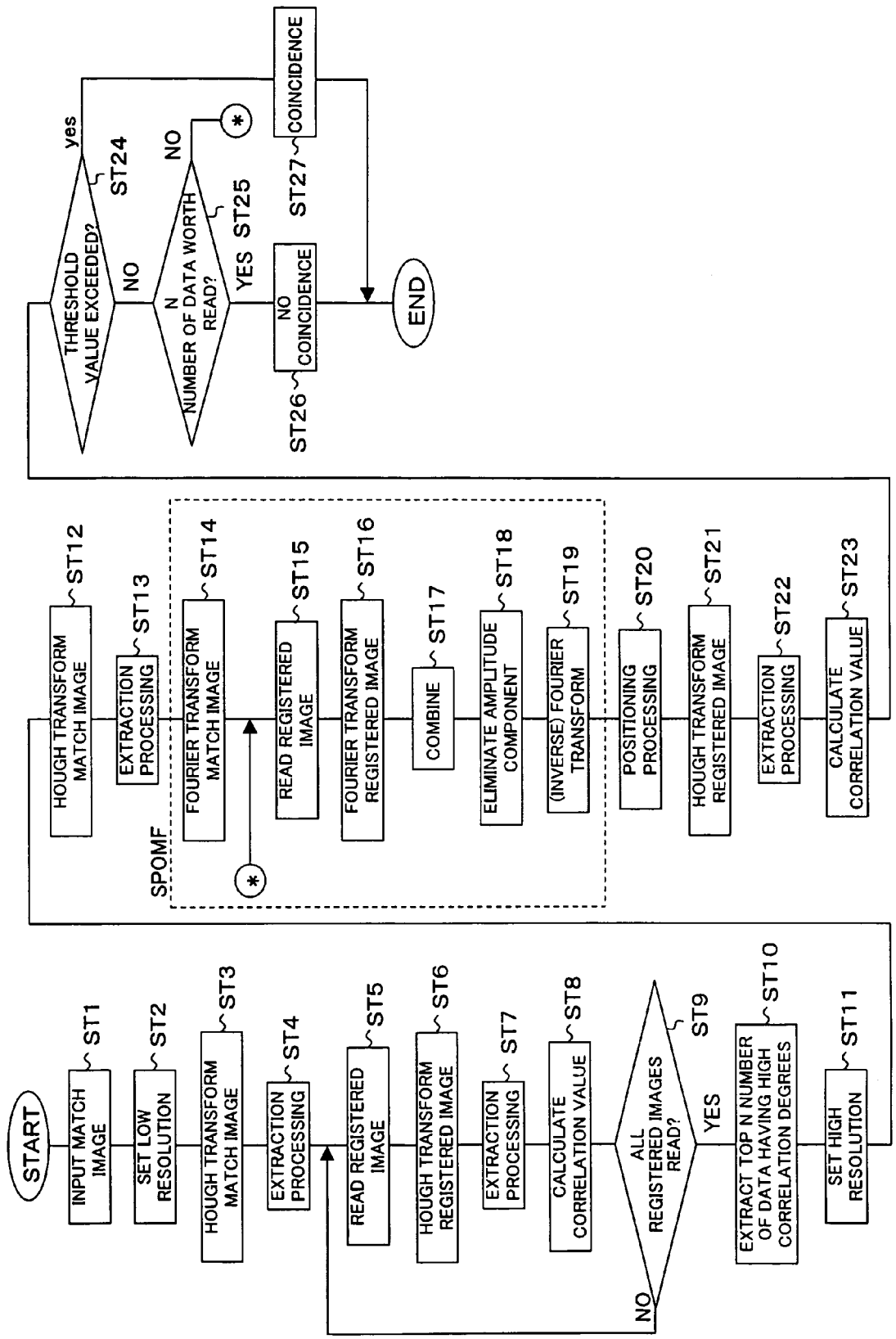
FIG. 10 is a flow chart for explaining a concrete example of the operation of the image match processing apparatus shown in FIG. 1.

FIG. 10 is a flow chart for explaining a concrete example of the operation of the image match processing apparatus shown in FIG. 1. An explanation will be given of the operation of the image match processing apparatus focusing on the operation of the CPU 17.

A plurality of registered images AIM are previously input from the image input unit 11 and stored in the data base 13. At step ST1, the match image RIM is input from the image input unit 11. At step ST2, the transform processing unit 14 sets a low resolution when performing Hough transform processing, while the low resolution transform unit 171 performs Hough transform processing for the match image RIM and generates a transformed match image S1711 having a low resolution (ST3). At step ST4, the extraction unit 172 performs the extraction processing based on the signal S1711 and outputs the signal S1721.

At step ST5, the low resolution (definition) transform unit 171 reads out the registered images AIM from the data base, performs Hough transform processing on the registered images AIM, and generates the transformed registered images S1712 having a low resolution (ST6). At step ST7, the extraction unit 172 performs the extraction processing based on the signals S1712 and outputs the signals S1722.

At step ST8, the correlation value generation unit 173 performs the correlation processing between each of the signals S1722 of the plurality of transformed registered images AIM and the signal S1721 as the transformed match image RIM and calculates the correlation value (correlation degree). At step ST9, the CPU 17 judges whether or not all registered images AIM in the data base 13 were read out and, when judging that they are not read out, returns to the processing of step ST5. Further, when judging that all registered images AIM are read out, the CPU 17 proceeds to the processing of step ST10.

At step ST10, the match coverage determination unit 174 determines the registered images AIM for match processing corresponding to the top predetermined number of transformed registered images AIML having high correlation degrees based on the signal S173 indicating the correlation degrees generated by the correlation value generation unit 173 and outputs a signal S174 indicating the determined registered images AIM.

At steps ST11 to ST23, the matching unit 175 performs the match processing of the registered images and the match image based on the transformed registered images and the transformed match image having a second resolution higher than the first resolution generated by performing Hough transform processing on each of the registered images AIM for match processing determined by the match coverage determination unit 174 and the match image RIM.

In more detail, at step ST11, the CPU 17 sets the image transform processing of the transform processing unit 14 to a high resolution. At step ST12, the high resolution transform unit 1753 performs Hough transform processing for the match image RIM and generates the signal S17531 as the transformed match image having a high resolution. At step ST13, the extraction unit 1754 performs the extraction processing based on the signal S17531 and outputs a signal S17541.

Next, the position correction processing between the match image RIM and the registered images AIM is carried out. In more detail, at step ST14, the Fourier transform unit (F) 17511 performs two-dimensional Fourier Transform processing on the match image RIM, generates the Fourier image data X(u, v), and outputs the same as a signal S17511 to the combining unit 17513. Further, the Fourier transform unit (F) 17512 reads out the registered images AIM (ST15), performs two-dimensional Fourier transform processing for the registered images AIM, and outputs the same as the signal S17512 to the combining unit 17513 (ST16).

At step ST17, the combining unit 17513 combines the data X(u, v) and Y(u, v) as the signals S17511 and S17512 generated in the Fourier transform units 17511 and 17512 to perform the correlation processing. For example, the combining unit 17513 generates X(u, v)×Y*(u, v) and outputs the same as the signal S17513 to the phase extraction unit 17514.

At step ST18, the phase extraction unit 17514 eliminates the amplitude component based on the combined signal S17513 output from the combining unit 17513 and extracts the phase information. At step ST19, the inverse Fourier transform unit (AF) 17515 performs the inverse Fourier transform processing based on the signal Z(u, v) as shown in Equation (8), generates the correlation emphasis image G(p, q), and outputs the same as a signal S1751 to the position correction unit 1752.

At step ST20, the position correction unit 1752 performs correction processing of the position shift between the match image RIM and a registered image AIM based on the signal S1751 and outputs the processing result as a signal S1752 to the high resolution transform unit 1753.

At step ST21, the high resolution (definition) transform unit 1753 performs Hough transform processing based on the signal S1752 indicating the position corrected registered images AIM and generates the signal S1753 of a high resolution. At step ST22, the extraction unit 1754 performs extraction processing (masking processing) based on the signal S17532 and generates a signal S17542.

At step ST23, the correlation value generation unit 1755 performs correlation processing, for example, generates the similarity Sim as the correlation degree based on the signals S17541 and S17542, and generates a signal S1755. At step ST24, the judgment unit 1756 judges whether or not the correlation degree, for example, the similarity Sim, is the previously set threshold value or more based on the signal S1755 generated by the correlation value generation unit 1755. The judgment unit 1756 judges that a registered image AIM and the match image RIM coincide when the similarity is the threshold value or more as the result of the judgment processing and outputs a signal S175 indicating the result of the judgment.

On the other hand, when the correlation degree is smaller than the threshold value at step ST24, the judgment unit 1756 reads out a predetermined number, i.e., N number in the present embodiment, of registered images AIM determined by the match coverage determination unit 174 and judges whether or not the match processing was carried out (ST25). When judging that N number of registered images AIM were not read out, it returns to the processing of step ST15. On the other hand, in the judgment of step ST25, the N number of registered images AIM determined by the match coverage determination unit 174 are read out to perform the match processing. When a correlation degree is lower than the threshold value, it is judged that the match image RIM and the registered image AIM do not coincide (ST26), and a signal S175 indicating the result of the judgment is output. The operation processing unit 18 performs predetermined processing for example for unlocking an electronic key when for example a registered image AIM and the match image RIM coincide based on for example the signal S175, while does not perform the unlocking processing when they do not coincide.

As explained above, since the present embodiment provides the low resolution (definition) transform unit 171 for performing Hough transform processing on each of a plurality of registered images AIM stored in the data base 13 and the match image RIM input from the image input unit 11 and generating a plurality of transformed registered images AIML and the transformed match image RIML having a first resolution (definition), the correlation value generation unit 173 for performing correlation processing between each of the plurality of transformed registered images AIML and the transformed match image RIML generated by the low resolution transform unit 171, the match coverage determination unit 174 for determining the registered images AIM for match processing corresponding to the top predetermined number of transformed registered images having a high resolution based on the results of the correlation processing by the correlation value generation unit 173, and the matching unit 175 for performing the match processing of the predetermined number of registered images and the match image based on the transformed registered images and the transformed match image having a second resolution (definition) higher than the first resolution (definition) generated by performing Hough transform processing on each of the registered images for match processing determined by the match coverage determination unit 174 and the match image RIM, even when the number of the registered images for match processing increases, the match processing time can be shortened.

That is, first, the embodiment calculates the correlation degrees among the Hough transform processed images having a low resolution and performs match processing between images after the Hough transform processing having a high resolution for only the images having high correlation degrees. Therefore, in comparison with the case where performing match processing between images after Hough transform processing having a high resolution for all registered images, the match processing time can be shortened. Further, by setting the number of the registered images AIM for match coverage to a previously set number, even when no registered image of a threshold value or more with respect to the input match image RIM is found, since the match processing is not carried out for all of the registered images stored in the data base, the processing time can be shortened.

Further, since the matching unit 175 is provided with the position shift detection unit 1751 and the position correction unit 1752 for performing Fourier transform processing for each of the registered images as the determined match processing object and the match image RIM and for performing the position correction processing based on the phase components as a result of the Fourier transform processing and performs match processing between the registered images and the match image based on the transformed registered images and the transformed match image having a second definition higher than the first definition generated by performing Hough transform processing on each of the position corrected registered images and the match image, so it is possible to perform the match processing with a higher precision.

Further, since the matching unit 175 is provided with the extraction unit 1754 for extracting a region in which the degree of superimposition of patterns of curves in one image is the previously set threshold value or more, the correlation value generation unit 1755 for generating the correlation degree based on the patterns in the region extracted by the extraction unit 1754, and the judgment unit 1756 for performing the match processing between the registered images and the match image based on the correlation degree, it is possible to perform the match processing with a higher precision.

Note that, the present invention is not limited to the above-mentioned embodiment and can be modified in various preferred ways. For example, it is also possible to provide a match coverage determination unit for determining the sequence of correlation degrees of the transformed registered images and the transformed match image as the sequence of the match processing between the registered images corresponding to the transformed registered images and the match images based on the results of the correlation processing by the correlation value generation unit 1755, perform the correlation processing on the transformed registered images and the transformed match image having a second resolution (definition) higher than the first resolution generated by performing Hough transform processing on each of the registered images and the match image in the sequence determined by the match coverage determination unit, and perform match processing between the registered images and the match image based on the results of the correlation processing.

The operation of the above configuration will be briefly explained next. First, at step ST101, the low resolution (definition) transform unit 171 performs Hough transform processing on each of a plurality of registered images AIM and the match image RIM and generates a plurality of transformed registered images and the transformed match image having a first resolution (definition) (low resolution). At step ST102, the correlation value generation unit 173 performs correlation processing between each of the plurality of transformed registered images and the transformed match image generated by the low resolution transform unit 171 at step ST101. At step ST103, the match coverage determination unit determines the sequence of correlation degrees of the transformed registered images and the transformed match image as the sequence of the match processing between the registered images corresponding to the transformed registered images and the match image based on the results of the correlation processing by the correlation value generation unit 173 at step ST102. At step ST104, the matching unit 175 performs the correlation processing for the transformed registered images and the transformed match image having a second definition higher than the first definition generated by performing Hough transform processing on each of the registered images and the match image in the sequence determined by the match coverage determination unit in step ST103 and performs match processing of the registered images AIM and the match image RIM based on the results of the correlation processing. By doing this, the match processing is carried out in the sequence from the highest correlation degree, so the match processing time can be shortened. Further, by ending the match processing at the point of time when a registered image AIM and the match image RIM coincide, the match processing time can be further shortened.

Further, the position correction processing was carried out based on the shift of the peak position in the correlation emphasis image obtained as the result of the SPOMF, but the present invention is not limited to this. For example, it is also possible to detect the shift with respect to a plurality of peak positions in the correlation emphasis image, generate the correlation values for a plurality of positioning candidates, and perform the match processing based on the processing result.

According to the present invention, an image matching system able to shorten the match processing time even when the number of images for match processing increases and a program and an image matching method can be provided.

The present invention can be applied to security related applications for matching two images of blood vessel images, fingerprint images, still images, and moving images based on the linear components in the images.

While the invention has been described with reference to specific embodiments chosen for purpose of illustration, it should be apparent that numerous modifications could be made thereto by those skilled in the art without departing from the basic concept and scope of the invention.

What is claimed is:

1. A blood vessel matching apparatus comprising:
an input image acquiring unit configured to acquire an input image;
a selecting unit configured to select one of a plurality of blood vessel images as a selected blood vessel image, the plurality of blood vessel images being different from each other;
a transforming unit configured to transform the input image to transformed input at a first resolution;
a first comparing unit configured to compare the transformed input with the selected blood vessel image, transformed at the first resolution;
a second comparing unit configured to compare the selected blood vessel image with the input image, the selected blood vessel image and the input image transformed at a second resolution higher than the first resolution, when the selected blood vessel image, transformed at the first resolution, matches the transformed input; and
a matching unit configured to determine a match between the input image and the selected blood vessel image based on a result of a comparison by said second comparing unit, wherein
said transforming unit is a Hough transform unit that performs image transform processing for transforming points in the input image to patterns of curves based on a distance from a reference position in the input image to the closest point on a straight line passing through the point in the input image and an angle formed by the straight line passing through the reference position and the closest point and a reference axis including the reference position and that transforms linear components in the input image to patterns of the plurality of superimposed curves to generate the transformed input.

2. The blood vessel matching apparatus of claim 1, wherein
the first comparing unit extracts a region in which the degree of superimposition of patterns of curves in one image is a previously set threshold value or more for the transformed input and the selected blood vessel image transformed at the first resolution, and
the second comparing unit compares the selected blood vessel image and the input image based on the patterns in the extracted region.

3. The blood vessel matching apparatus of claim 1, wherein
the first comparing unit compares positional relationships in the selected blood vessel image and the transformed input and generates similarities as correlation degrees according to results of the comparison, and
the second comparing unit compares the selected blood vessel image and the input image based on the generated similarities.

4. A blood vessel registration apparatus comprising:
an input image acquiring unit configured to acquire an input image;
a first registration unit configured to register blood vessel images corresponding to the input image;
a transforming unit configured to transform the input image to transformed input at a lower resolution than the input image; and
a second registration unit configured to register the transformed input for searching the blood vessel images for a match, wherein
said transforming unit is a Hough transform unit that performs image transform processing for transforming points in the input image to patterns of curves based on a distance from a reference position in the input image to the closest point on a straight line passing through the point in the input image and an angle formed by the straight line passing through the reference position and the closest point and a reference axis including the reference position and that transforms linear components in the input image to patterns of the plurality of superimposed curves to generate the transformed input.

5. A blood vessel storage apparatus comprising:
a first storage section configured to store blood vessel images; and
a second storage section configured to store transformed images which are transformed from the blood vessel images, the transformed images being transformed by a transforming unit and the second storage section being used to match an input image to one of the blood vessel images, wherein
said transforming unit is a Hough transform unit that performs, for each of the blood vessel images, image transform processing for transforming points in the blood vessel image to patterns of curves based on a distance from a reference position in the blood vessel image to the closest point on a straight line passing through the point in the blood vessel image and an angle formed by the straight line passing through the reference position and the closest point and a reference axis including the reference position and that transforms linear components in the blood vessel image to patterns of the plurality of superimposed curves to generate a transformed image.

6. A blood vessel matching method comprising:
acquiring an input image;
selecting one of a plurality of blood vessel images as a selected blood vessel image, the plurality of blood vessel images being different from each other;
transforming the input image to transformed input at a first resolution;
first comparing step of comparing the selected blood vessel image, transformed at the first resolution, with the transformed input;
second comparing step of comparing the selected blood vessel image, transformed at a second resolution higher than the first resolution, with the input image, transformed at the second resolution, when the selected blood vessel information, transformed at the first resolution, matches the transformed input; and
matching the input image to the selected blood vessel image based on a result of the second comparing step, wherein
said transforming includes performing a Hough transform by performing image transform processing for transforming points in the input image to patterns of curves based on a distance from a reference position in the input image to the closest point on a straight line passing through the point in the input image and an angle formed by the straight line passing through the reference position and the closest point and a reference axis including the reference position and transforming linear components in the input image to patterns of the plurality of superimposed curves to generate the transformed input.

7. The blood vessel authentication method of claim 6, wherein
the first comparing step extracts a region in which the degree of superimposition of patterns of curves in one image is a previously set threshold value or more for the selected blood vessel image, transformed at the first resolution, and the transformed input, and the second comparing step compares the selected blood vessel image and the input image based on the patterns in the extracted region.

8. The blood vessel authentication apparatus of claim 6, wherein
the first comparing step compares positional relationships in the selected blood vessel image, transformed at the first resolution, and the transformed input and generates similarities as correlation degrees according to results of the comparison, and
the second comparing step compares the selected blood vessel information and the input image based on the generated similarities.

9. A blood vessel registration method comprising:
acquiring an input image;
first registration step of registering blood vessel images corresponding to the input image;
transforming the input image to transformed input having a lower resolution than the input image; and
second registration step of registering the transformed input for searching the blood vessel images, wherein
said transforming includes performing a Hough transform by performing image transform processing for transforming points in the input image to patterns of curves based on a distance from a reference position in the input image to the closest point on a straight line passing through the point in the input image and an angle formed by the straight line passing through the reference position and the closest point and a reference axis including the reference position and transforming linear components in the input image to patterns of the plurality of superimposed curves to generate the transformed input.

10. A blood vessel storage method comprising:
first storage step of storing blood vessel images; and
second storage step of storing transformed images which are transformed from the blood vessel images, the transformed images resulting from a Hough transform which includes performing, for each of the blood vessel images, image transform processing for transforming points in the blood vessel image to patterns of curves based on a distance from a reference position in the blood vessel image to the closest point on a straight line passing through the point in the blood vessel image and an angle formed by the straight line passing through the reference position and the closest point and a reference axis including the reference position and transforming linear components in the blood vessel image to patterns of the plurality of superimposed curves to generate a transformed image.

11. An image matching system comprising
a transforming unit for performing Hough transform processing on each of a plurality of registered images and a match image and generating a plurality of transformed registered images and a transformed match image having a first resolution;
a correlation processing unit for performing correlation processing between each of the plurality of transformed registered images and the transformed match image generated by the transforming unit;
a determining unit for determining a subset of the registered images for match processing, the subset of the registered images corresponding to the top predetermined number of transformed registered images having high correlation degrees based on the results of the correlation processing by the correlation processing unit; and a match processing unit for performing match processing of the subset of the registered images and the match image based on the subset of the registered images and the match image being transformed at a second resolution, higher than the first resolution, by performing Hough transform processing on the subset of the registered images and the match image, wherein
said transforming unit performing the Hough transform performs, for each of the plurality of registered images and for the match image, image transform processing for transforming points in the registered image and the match image to patterns of curves based on a distance from a reference position in the registered image and the match image to the closest point on a straight line passing through the point in the registered image and the match image and an angle formed by the straight line passing through the reference position and the closest point and a reference axis including the reference position and that transforms linear components in the registered image and the match image to patterns of the plurality of superimposed curves to generate the transformed registered image and the transformed match image.

12. An image matching system as set forth in claim 11, wherein the match processing unit performs Fourier transform processing for each of the subset of the registered images and the match image and performs match processing of the registered images and the match image based on the subset of the registered images and the match image being transformed at the second resolution, higher than the first resolution, generated by performing the Hough transform processing for each of the subset of the registered images and the match image corrected in position based on the phase components of the results of the Fourier transform processing.

13. An image matching system as set forth in claim 11, wherein the match processing unit extracts a region in which the degree of superimposition of patterns of curves in one image is a previously set threshold value or more for each of the subset of the registered images and the match image transformed at the second resolution and performs match processing of the registered images and the match image based on the patterns in the extracted region.

14. An image matching system as set forth in claim 11, wherein the match processing unit performs comparison processing for each of different plurality of positional relationships in the subset of the registered images and the match image transformed at the second resolution, generates similarities as the correlation degrees according to the results of the comparison processing, and performs the match processing between the subset of the registered images and the match image based on the generated similarities.

15. An image matching system comprising
a transforming unit for performing Hough transform processing on each of a plurality of registered images and a match image and generating a plurality of transformed registered images and a transformed match image having a first resolution;
a correlation processing unit for performing correlation processing between each of the plurality of transformed registered images and the transformed match image generated by the transforming unit;
a determining unit for determining a sequence of correlation degrees of the transformed registered images and the transformed match image as a sequence of match processing of the registered images, corresponding to the transformed registered images, and the match image, based on the results of the correlation processing by the correlation processing unit; and a match processing unit for performing correlation processing on the registered images and the match image, the registered images and the match image being transformed at a second resolution, higher than the first resolution, and generated by performing Hough transform processing on each of the registered images and the match image in the sequence determined by the determining unit and performing the match processing of the registered images and the match image based on the results of the correlation processing, wherein said transforming unit performing the Hough transform performs, for each of the plurality of registered images and for the match image, image transform processing for transforming points in the registered image and the match image to patterns of curves based on a distance from a reference position in the registered image and the match image to the closest point on a straight line passing through the point in the registered image and the match image and an angle formed by the straight line passing through the reference position and the closest point and a reference axis including the reference position and that transforms linear components in the registered image and the match image to patterns of the plurality of superimposed curves to generate the transformed registered image and the transformed match image.

16. An image matching method of an image matching system, comprising:

a first step of performing Hough transform processing on each of a plurality of registered images and a match image and generating a plurality of transformed registered images and a transformed match image having a first resolution;

a second step of performing correlation processing between each of the plurality of transformed registered images and the transformed match image generated at the first step;

a third step of determining a subset of the registered images for match processing corresponding to the top predetermined number of transformed registered images having high correlation degrees based on results of the correlation processing at the second step; and a fourth step for performing match processing of the registered images and the match image based on the transformed registered images and the transformed match image having a second resolution higher than the first resolution generated by performing Hough transform processing on each of the registered images for match processing determined at the third step and the match image, wherein said performing the Hough transform processing includes performing for each of the plurality of registered images and for the match image, image transform processing for transform in points in the registered image and the match image to patterns of curves based on a distance from a reference position in the registered image and the match image to the closest point on a straight line passing through the point in the registered image and the match image and an angle formed by the straight line passing through the reference position and the closest point and a reference axis including the reference position and that transforms linear components in the registered image and the match image to patterns of the plurality of superimposed curves to generate the transformed registered image and the transformed match image.

17. An image matching method of a image matching system, comprising:

a first step of performing Hough transform processing on each of a plurality of registered images and a match image and generating a plurality of transformed registered images and a transformed match image having a first resolution;

a second step of performing correlation processing between each of the plurality of transformed registered images and the transformed match image generated at the first step;

a third step of determining a sequence of correlation degrees of the transformed registered images and the transformed match image as the sequence of the match processing of the registered images corresponding to the transformed registered images and the match image based on the results of the correlation processing at the second step; and a fourth step of performing correlation processing on the transformed registered images and the transformed match image having a second resolution higher than the first resolution generated by performing the Hough transform processing for each of the registered images and the match image in the sequence determined at the third step, and performing match processing of the registered images and the match image based on the results of the correlation processing, wherein said performing the Hough transform processing includes performing for each of the plurality of registered images and for the match image, image transform processing for transforming points in the registered image and the match image to patterns of curves based on a distance from a reference position in the registered image and the match image to the closest point on a straight line passing through the point in the registered image and the match image and an angle formed by the straight line passing through the reference position and the closest point and a reference axis including the reference position and that transforms linear components in the registered image and the match image to patterns of the plurality of superimposed curves to generate the transformed registered image and the transformed match image.

* * * * *